United States Patent
Hokiyama (10) Patent No.: US 10,361,872 B2
(45) Date of Patent: Jul. 23, 2019

(54) VERIFYING VALIDITY OF A CERTIFICATE OF A PUBLIC KEY USING BOTH OF A REVOCATION LIST AND QUERYING A VERIFICATION SERVER

(71) Applicant: CANON KABUSHIKI KAISHA, Tokyo (JP)

(72) Inventor: Takeshi Hokiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 15/422,229

(22) Filed: Feb. 1, 2017

(65) Prior Publication Data

US 2017/0250825 A1 Aug. 31, 2017

(30) Foreign Application Priority Data

Feb. 25, 2016 (JP) .................................. 2016-034716

(51) Int. Cl.
*H04L 9/32* (2006.01)
*H04L 9/00* (2006.01)
*H04L 29/06* (2006.01)

(52) U.S. Cl.
CPC ............ *H04L 9/3268* (2013.01); *H04L 9/006* (2013.01); *H04L 63/0428* (2013.01); *H04L 63/0823* (2013.01)

(58) Field of Classification Search
None
See application file for complete search history.

(56) References Cited

U.S. PATENT DOCUMENTS

| 6,301,658 | B1 * | 10/2001 | Koehler | G06F 21/33 380/255 |
| 7,644,270 | B1 * | 1/2010 | Cherukumudi | H04L 63/0823 709/206 |
| 2004/0111609 | A1 * | 6/2004 | Kaji | H04L 9/006 713/156 |
| 2005/0021969 | A1 * | 1/2005 | Williams | H04L 9/3268 713/176 |
| 2005/0240777 | A1 * | 10/2005 | Keohane | H04L 63/0823 713/185 |
| 2006/0294576 | A1 * | 12/2006 | Cross | H04L 63/20 726/1 |
| 2007/0016783 | A1 * | 1/2007 | Saito | H04L 9/3247 713/175 |
| 2010/0122081 | A1 * | 5/2010 | Sato | H04L 9/0891 713/158 |
| 2011/0154017 | A1 * | 6/2011 | Edstrom | H04L 63/0823 713/151 |

(Continued)

FOREIGN PATENT DOCUMENTS

JP 2008-244914 10/2008

*Primary Examiner* — Jason Chiang
(74) *Attorney, Agent, or Firm* — Venable LLP (57) ABSTRACT

An image forming apparatus that performs an encrypted communication using a public key, and a method of controlling the same, determine the validity of a certificate in accordance with a certificate revocation list and/or the query to the certificate verification server. At a time of the determination of the validity of the certificate, it is selected whether to use any one of the certificate revocation list and the query to the certificate verification server, or both of the certificate revocation list and the query to the certificate verification server.

12 Claims, 9 Drawing Sheets (56) References Cited

U.S. PATENT DOCUMENTS

| | | | |
|---|---|---|---|
| 2014/0149740 A1* | 5/2014 | Sato | H04L 9/006 |
| | | | 713/158 |
| 2014/0281500 A1* | 9/2014 | Ignatchenko | H04L 9/3263 |
| | | | 713/156 |
| 2016/0044023 A1* | 2/2016 | Barr | H04L 63/0823 |
| | | | 726/1 |
| 2016/0087972 A1* | 3/2016 | Ahmavaara | H04L 63/0823 |
| | | | 726/10 |
| 2016/0134621 A1* | 5/2016 | Palanigounder | H04W 12/06 |
| | | | 713/156 |

* cited by examiner

VERIFYING VALIDITY OF A CERTIFICATE OF A PUBLIC KEY USING BOTH OF A REVOCATION LIST AND QUERYING A VERIFICATION SERVER

BACKGROUND OF THE INVENTION

Field of the Invention

The present invention relates to an authentication system, an image forming apparatus, a method of controlling the same, and storage medium.

Description of the Related Art

Spoofing of a communication destination is prevented by confirming the validity of a public key certificate of the communication destination when an image forming apparatus performs encrypted communication such as SSL/TLS with an external IT device. A standard specification relating to an issuance of a public key certificate and a confirmation of validity is defined by RFC 5280 (Internet X.509 Public Key Infrastructure Certificate and CRL Profile) and the like.

In a case when an erroneous issuance or a change in content recited in a certificate arises, the public key certificate is revoked by the certificate authority that issued the certificate. For this reason, it is necessary to confirm whether the certificate has not expired in order to confirm the validity of the public key certificate. A method exists in which a public key certificate revocation list (hereinafter, CRL) that a certificate authority issued is used for a revocation confirmation for the certificate. In such a CRL, serial numbers of revoked certificates and a validity period of the CRL itself are recited, and such a CRL is issued regularly with the signature of the certificate authority attached thereto.

In a case when the current image forming apparatus verifies the validity of the public key certificate, if the serial number of the public key certificate of the communication destination is recited in the CRL, the certificate is determined to be revoked, and if not recited in the CRL, the certificate is determined to be valid.

However, because the size of the CRL becomes large when the number of revoked certificates becomes large, there is a problem in that much time is required for the image forming apparatus to obtain the CRL, and so the time required for verification of the validity of the certificate increases, and the start of an encrypted communication with a communication destination is delayed. For this reason, performing a verification of the certificate by using a CRL obtained in advance rather than obtaining a CRL for every verification of the certificate can be considered. However, in such a case, there is a possibility that an already revoked certificate will be erroneously determined to be valid because the contents of the CRL are not the most recent.

To handle this, there is a method for using an OCSP (Online Certificate Status Protocol) for querying online whether or not the public key certificate is revoked and obtaining a reply. In the OCSP, a verification server regularly obtains the CRL in advance, and confirms whether a certificate about which a query is received is recited in the CRL, and only replies the verification result for it. By this, the apparatus that makes the query can shorten the time required for verification of the validity of the certificate as compared to when it obtains a CRL because it is possible to obtain the verification result only. In this way, there are various methods of verifying a certificate and for example, a method for selecting an optimal certificate verification method in accordance with an environment parameter such as a communication rate of a network is recited in Japanese Patent Laid-Open No. 2008-244914.

However, several problems exist in the technique recited in the aforementioned Japanese Patent Laid-Open No. 2008-244914 when considering performing a verification of a public key certificate in the image forming apparatus rather than in a system which specializes in performing verification of certificates.

Firstly, in order to dynamically determine a method of verification of a certificate, it is necessary to constantly measure an environment parameter such as a communication rate of a network, and to perform a calculation for determining the optimal method of verifying a certificate each time. There is a problem in that the processing load for the image forming apparatus becomes large.

Also, although the certificate is verified by a dynamically determined method of verification, there also is a problem in the respective methods of verification as below. Regarding CRL, as mentioned previously, the time required for the obtainment increases when the size of the CRL becomes large. Also, there is a possibility that an already revoked certificate will be erroneously determined to be valid in a case where the CRL obtained in advance is used and the contents of the CRL are not the most recent. Also regarding the OCSP, while there is the advantage that it is possible to reliably confirm the validity of the certificate, there is the problem that the processing load on the image forming apparatus becomes large because a query to the verification server via the network always occurs.

SUMMARY OF THE INVENTION

An aspect of the present invention is to eliminate the above-mentioned problems with the conventional techniques.

A feature of the present invention is to provide a technique by which it is possible to reduce a processing load when executing a confirmation of the validity of a public key certificate that is necessary when performing an encrypted communication.

According to a first aspect of the present invention, there is provided an image forming apparatus for performing an encrypted communication using a public key, the apparatus comprising: a memory device that stores a set of instructions; at least one processor that executes the instructions to: obtain a certificate revocation list; make a query to a certificate verification server as to a validity of a certificate of the public key; determine the validity of the certificate in accordance with the certificate revocation list and/or the query to the certificate verification server; and at a time of the determination of the validity of the certificate, select any one of the certificate revocation list and the query to the certificate verification server, or both the certificate revocation list and performance of the query to the certificate verification server.

According to a second aspect of the present invention, there is provided an authentication system that includes an image forming apparatus for performing an encrypted communication using a public key, the system comprising: a certificate authority; and a verification server configured to verify a validity of a certificate, wherein the image forming apparatus comprises: a memory device that stores a set of instructions; at least one processor that executes the instructions to: obtain a certificate revocation list from the certificate authority and hold the certificate revocation list; query the verification server as to the validity of a certificate of the public key; determine the validity of the certificate in accordance with the certificate revocation list and/or the query by the query unit; and at a time of the determination of the validity of the certificate by the determination unit, select whether to use any one of the certificate revocation list and the query unit, or to use both the certificate revocation list and the query of the validity of the certificate of the public key.

According to a third aspect of the present invention, there is provided a method of controlling an image forming apparatus for performing an encrypted communication using a public key, the method comprising: obtaining a certificate revocation list; querying a certificate verification server as to a validity of a certificate of the public key; determining the validity of the certificate in accordance with the certificate revocation list and/or the query; and at a time of the determining of the validity of the certificate, selecting to use any one of the certificate revocation list and the query, or to use both the certificate revocation list and the query.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
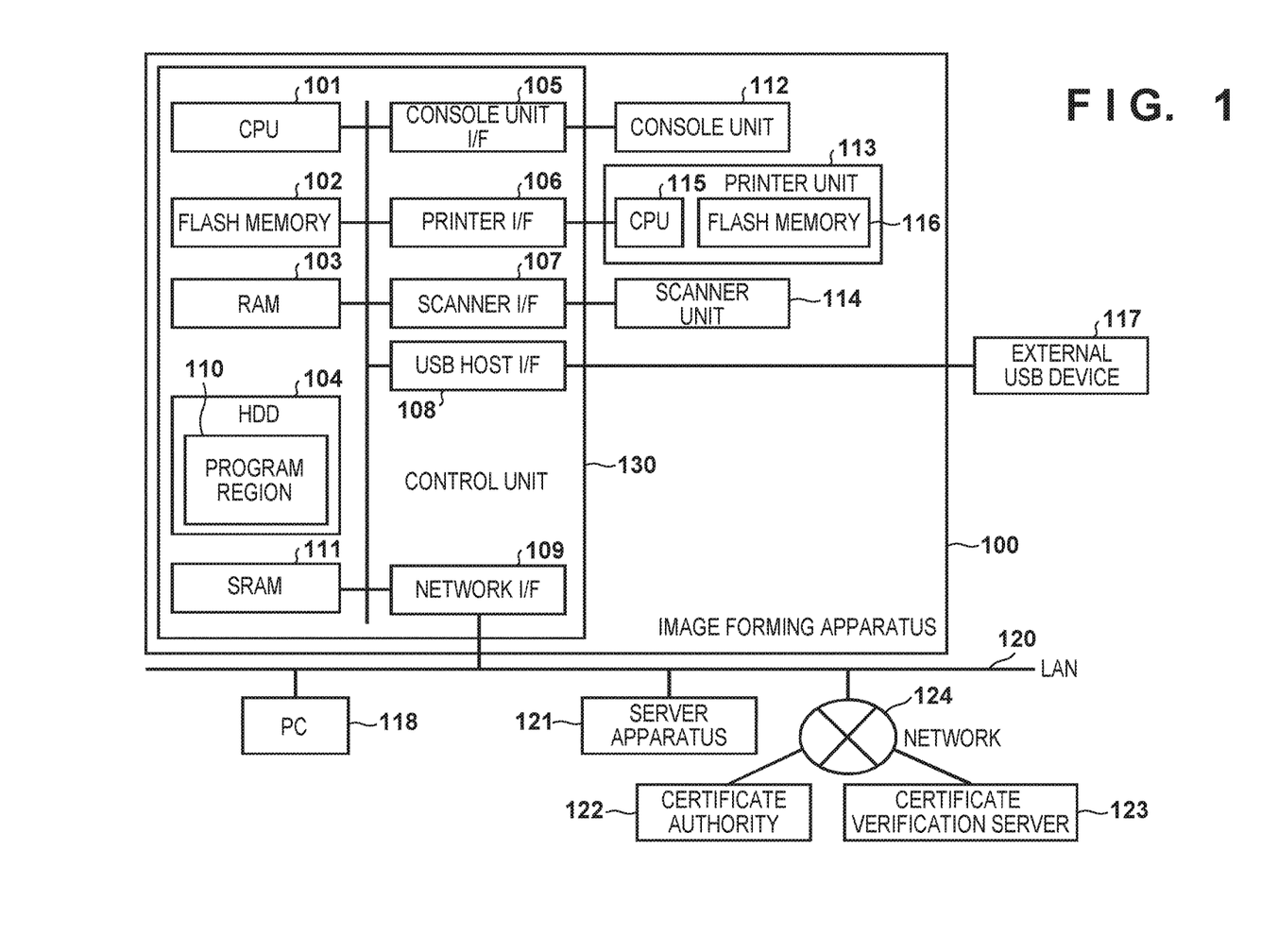
FIG. 1 is a block diagram for describing a configuration of an image forming apparatus and a configuration of an authentication system according to a first embodiment of the present invention.

FIG. 1 is a block diagram for describing a configuration of an image forming apparatus 100 and a configuration of an authentication system according to a first embodiment of the present invention.

A control unit 130 is a unit for controlling the entire image forming apparatus 100 and includes what is indicated below. A CPU 101 deploys programs for the control unit 130 stored in a flash memory (registered trademark) 102 and a program stored in a program region 110 of a hard disk drive (HDD) 104 to a RAM 103 and executes the programs. The HDD 104 stores print data received from a PC 118 via a network I/F (interface) 109. Also, an application program for printing described later is included in programs executed by the CPU 101. Also, print data stored in the HDD 104 is converted to image data that can be printed by a printer unit 113 by an application program for printing. Also, the image data that can be printed by the printer unit 113 is stored in the HDD 104. Also, an application program for scanning is included in the programs executed by the CPU 101. The CPU 101 executes the application program for scanning, obtains image data generated by a scanner unit 114 that read an original, and stores the image data to the HDD 104. A console unit I/F 105 is an I/F (interface) for transferring an instruction inputted by an operator of the image forming apparatus 100 to the CPU 101 via the console unit 112. Also, the console unit I/F 105 receives data to be displayed on the console unit 112 and transfers it to the console unit 112 from the CPU 101.

A printer I/F 106 is an I/F for connecting the control unit 130 and the printer unit 113. Here, the printer unit 113 prints an image on a sheet (paper) based on image data transferred from the HDD 104 via the printer I/F 106. Also, the printer unit 113 has a CPU 115 and a flash memory 116. The CPU 115 executes programs stored in the flash memory 116 and causes the printer unit 113 to execute various operations associated with print processing.

A scanner I/F 107 is an I/F for connecting the control unit 130 and the scanner unit 114. Here, the scanner unit 114 uses a line sensor configured by a CCD or the like to read an image of the original as image data. Then, the scanner unit 114 transfers the image data obtained by reading the original to the HDD 104 via the scanner I/F 107 and causes it to be stored. In this way, the image data stored in the HDD 104 can be caused to be printed by the previously described printer unit 113 and copy (copy) processing by printing the image data read by the scanner unit 114 by the printer unit 113 becomes possible.

A USB host I/F 108 is an I/F for connecting the control unit 130 and an external USB device 117. Here, a USB memory, a USB keyboard, or the like are given as an example of the external USB device 117. Programs are stored in the USB memory and the programs are downloaded via the USB host I/F 108 and installed to a file storage region of the flash memory 102. The network I/F 109 connects the control unit 130 to a LAN 120 and performs communication between the PC 118 and a server apparatus 121 on the LAN 120, and between a certificate authority 122 and a certificate verification server 123 on a network 124. The certificate verification server 123 is a server which replies as to whether or not a designated certificate is valid and this is referred to as an OCSP responder. An SRAM 111 is used for storing setting values of the image forming apparatus 100 necessary for execution of programs by the control unit 130.

Figure 2A:
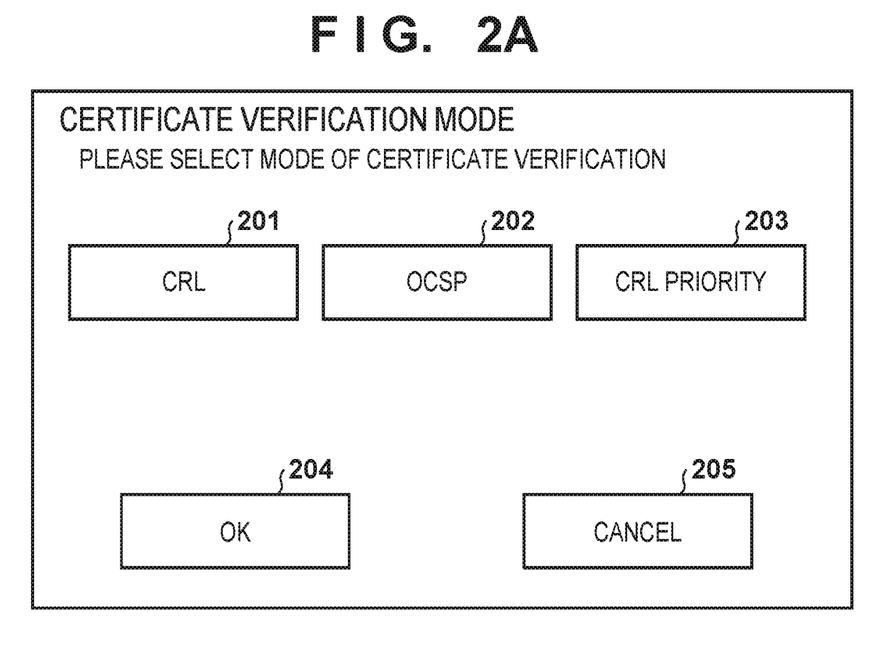
FIGS. 2A and 2B depict views respectively illustrating examples of UI screens displayed on a console unit of the image forming apparatus according to the first embodiment.
Figure 2B:
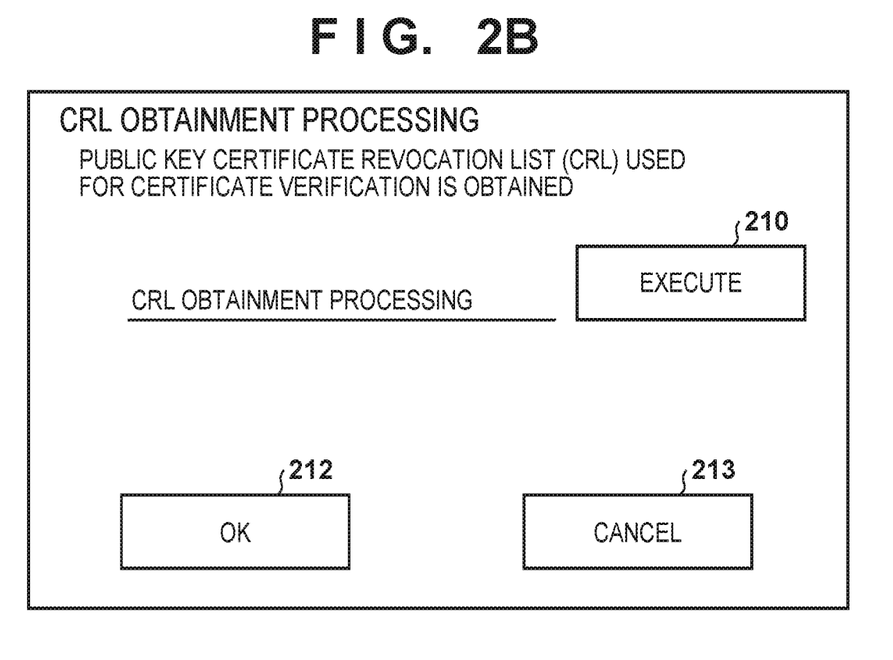

FIGS. 2A and 2B depict views respectively illustrating examples of UI screens displayed on the console unit 112 of the image forming apparatus 100 according to the first embodiment. Also, here, the display unit of the console unit 112 has a touch panel function and a user can make an instruction for a selection of a mode or an execution of processing by touching buttons on the screen.

FIG. 2A depicts a view illustrating an example of a screen for allowing a user (administrator) to select a mode for verifying a certificate.

This screen includes a button 201 for making an instruction so that a public key certificate revocation list (CRL) is used, a button 202 for making an instruction of a mode for using OCSP (Online Certificate Status Protocol), and a CRL priority button 203. An OK button 204 is a button for causing a finalization of a setting on the screen and a cancel button 205 is a button for cancelling a setting of the screen.

FIG. 2B depicts a view illustrating an example of a screen for a user to make an instruction to the image forming apparatus 100 so that a public key certificate revocation list (CRL) is obtained. Here, CRL obtainment processing is started when an execute button 210 is selected and an OK button 212 is pressed. A cancel button 213 is a button for making an instruction so that a setting on the screen is cancelled.

Also, a verification mode instructed by the above described buttons 201 through 203 is described later with reference to the flowcharts of FIG. 5 through FIG. 7.

Figure 3:
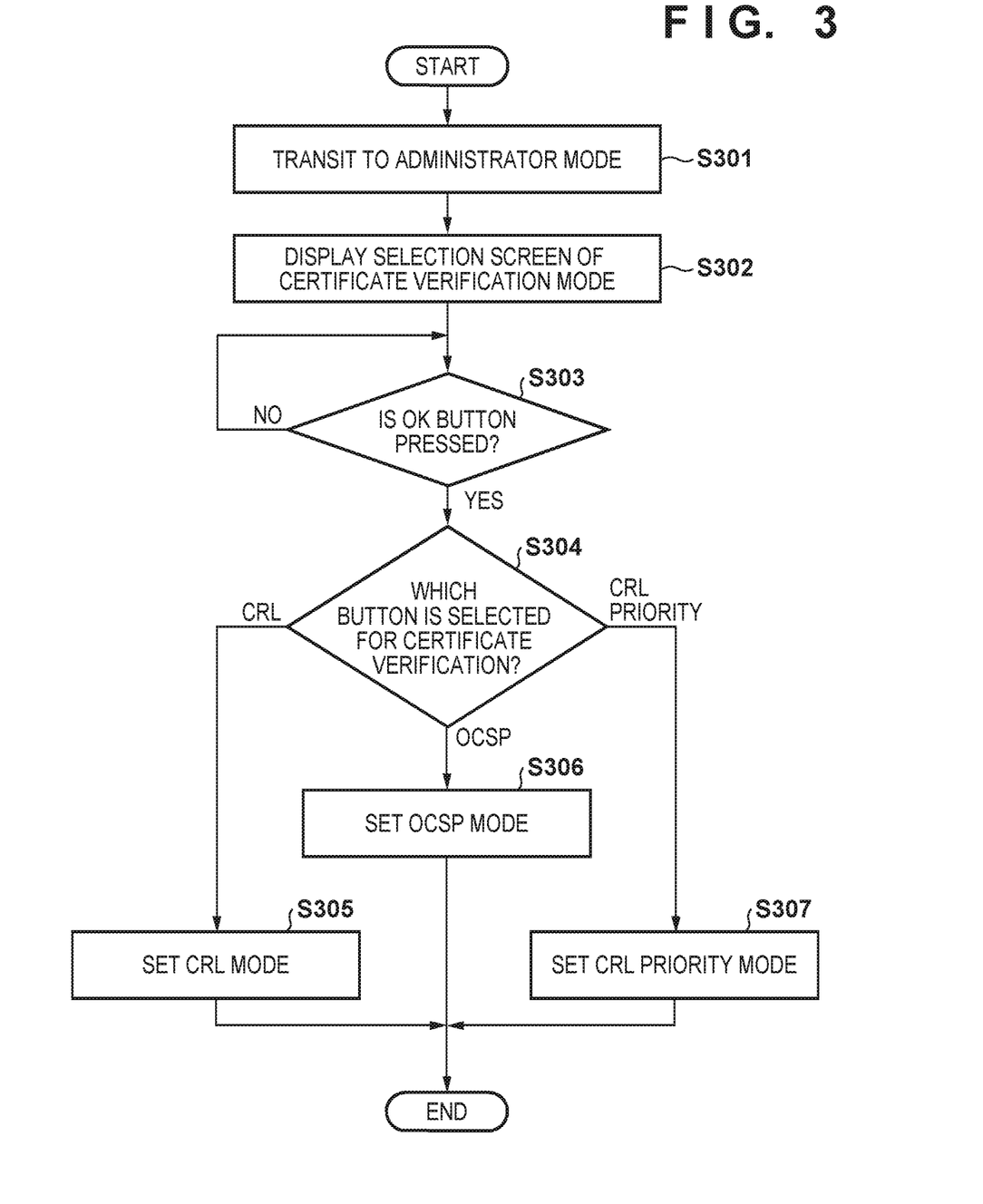
FIG. 3 is a flowchart for describing processing for setting to the image forming apparatus a certificate verification mode that an administrator selected, in the image forming apparatus according to the first embodiment.

FIG. 3 is a flowchart for describing processing for setting to the image forming apparatus a certificate verification mode that a user (an administrator) has selected in the image forming apparatus 100 according to the first embodiment. Also, the processing described by the flowchart is achieved by executing a program that the CPU 101 deployed to the RAM 103 from the flash memory 102.

Firstly, the CPU 101 in step S301 causes the image forming apparatus 100 to transition to an administrator mode in accordance with an instruction input via the console unit 112 by the administrator of the image forming apparatus 100. Next, the processing proceeds to step S302 and the CPU 101 displays to the console unit 112 the certificate verification mode selection screen illustrated in the previously described FIG. 2A. Next, the processing proceeds to step S303 and the CPU 101 determines whether or not the OK button 204 on the certificate verification mode selection screen is pressed, and if the OK button 204 is pressed, the processing proceeds to step S304. In step S304, the CPU 101 determines which button has been selected, when the OK button 204 is pressed, out of the previously described buttons 201 through 203, sets a mode in any one of step S305 through step S307 according to the selected button, and ends the processing. Also, the selected verification mode is held in the RAM 103.

In this way, it is possible for the administrator of the image forming apparatus 100 to set one of the certificate verification modes (using a public key certificate revocation list (CRL), using an OCSP, or using a CRL preferentially) in the image forming apparatus 100. Also, processing for when the CRL priority mode is selected will be described later with reference to FIG. 7.

Figure 4:
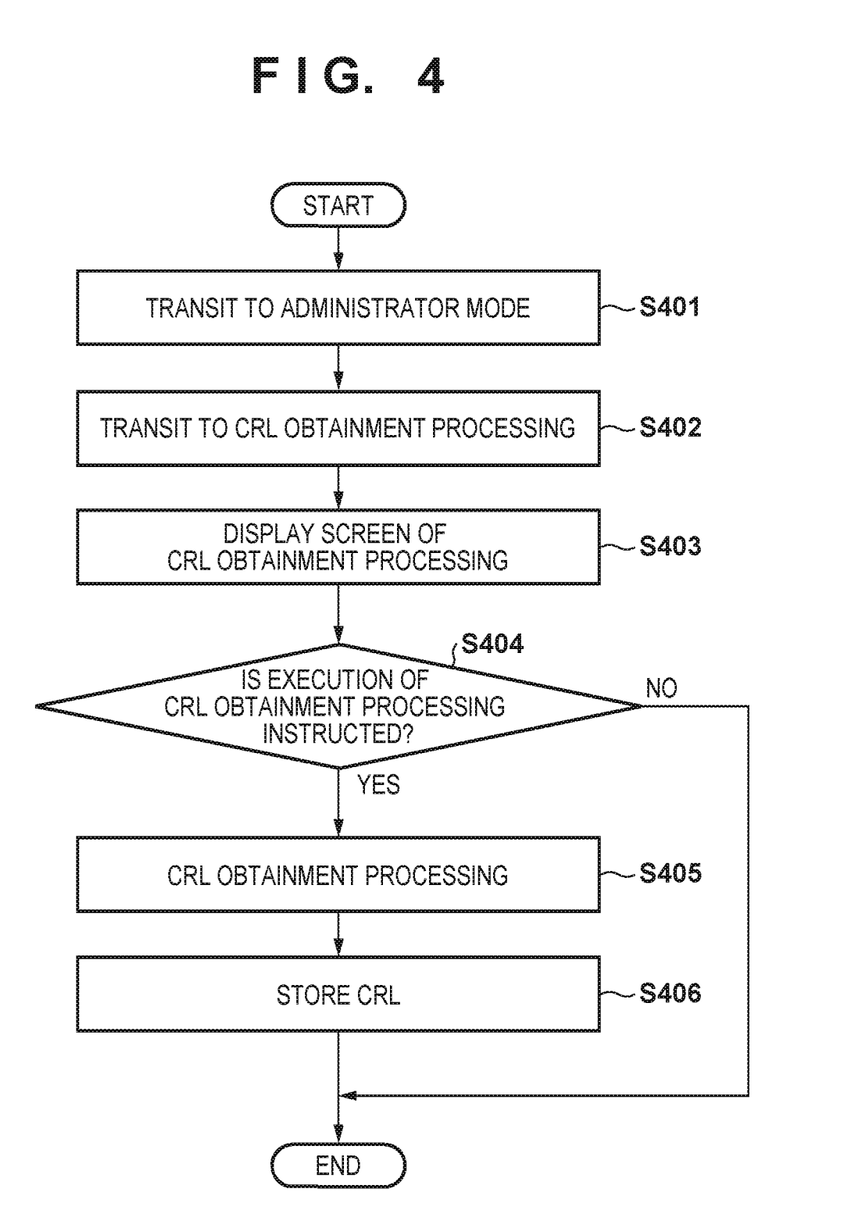
FIG. 4 is a flowchart for describing processing in which the image forming apparatus according to the first embodiment obtains a CRL according to an instruction of an administrator.

FIG. 4 is a flowchart for describing processing in which the image forming apparatus 100 according to the first embodiment obtains a CRL according to an instruction of an administrator. Also, the processing described by the flowchart is achieved by executing a program that the CPU 101 deployed to the RAM 103 from the flash memory 102. Also, an obtainment of the CRL is performed regularly by the administrator.

Firstly, the CPU 101 in step S401 transitions to an administrator mode in accordance with an instruction performed by the administrator of the image forming apparatus 100 operating the console unit 112. Next, the processing proceeds to step S402 and the CPU 101 transitions to CRL obtainment processing according to an instruction of the administrator. Next, the processing proceeds to step S403 and the CPU 101 displays a screen for making an instruction for CRL obtainment processing as illustrated in FIG. 2B for example.

Next, the processing proceeds to step S404 and the CPU 101 awaits the pressing of the OK button 212 on the screen as illustrated in FIG. 2B. If the CRL obtainment processing execute button 210 is selected when the OK button 212 is pressed, the processing proceeds to step S405, and if this is not the case, for example, when the cancel button 213 is pressed, the processing ends. In step S405, the CPU 101 accesses the certificate authority 122 via the network I/F 109 and the network 124 to obtain a CRL from the certificate authority 122. Then, in step S406, the CPU 101 stores the obtained CRL to the HDD 104 and the processing ends.

By this, hereinafter, in a case when the CRL button 201 in FIG. 2A is selected and the CRL mode is set, for example, it is possible to determine whether or not the used certificate is valid with reference to the public key certificate revocation list (CRL) stored in the HDD 104.

Also, for example, configuration may also be taken such that the CRL obtainment processing described in FIG. 4 is automatically executed in a time period when the image forming apparatus 100 is not used, such as in the middle of the night, to make the public key certificate revocation list stored in the HDD 104 closer to being the most recent.

Figure 5:
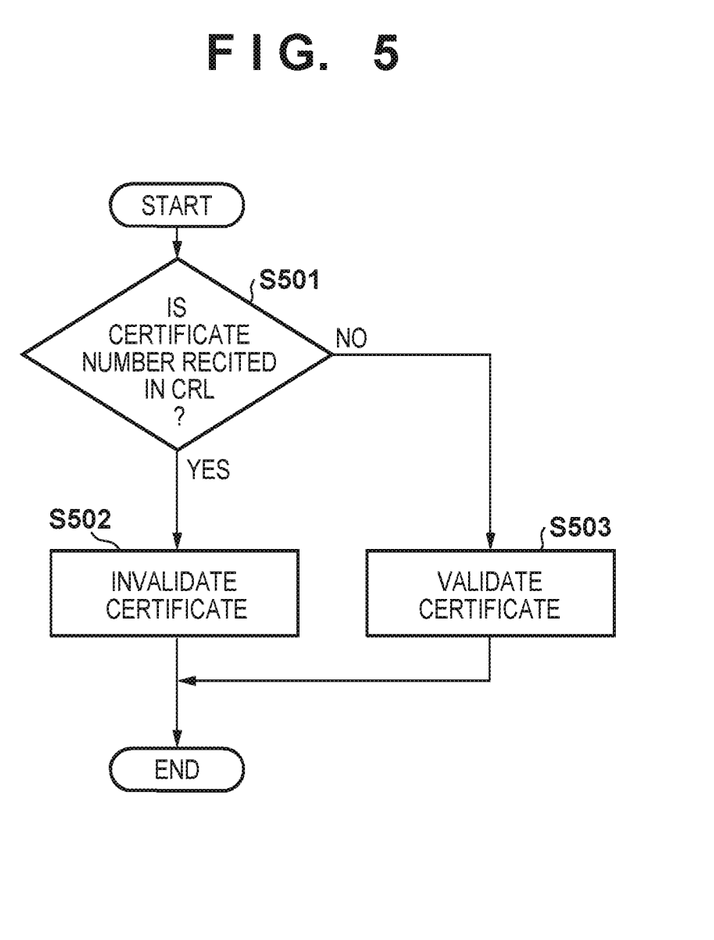
FIG. 5 is a flowchart for describing processing in which the image forming apparatus according to the first embodiment determines whether or not a certificate is valid from a CRL when a CRL mode is selected as the certificate verification mode.

FIG. 5 is a flowchart for describing processing in which the image forming apparatus 100 according to the first embodiment determines whether or not a certificate is valid from a CRL when the CRL mode is selected as the certificate verification mode. Also, the processing described by the flowchart is achieved by executing a program that the CPU 101 deployed to the RAM 103 from the flash memory 102.

Firstly, in step S501, the CPU 101 reads the CRL stored in the HDD 104 in step S406 of FIG. 4 and determines whether or not a certificate number for which validity is desired to be confirmed is recited in the CRL. Here, the processing proceeds to step S502 in a case when the certificate number is recited in the CRL, the certificate is invalidated, and the processing ends. Meanwhile, in a case when the certificate number for which the validity is desired to be confirmed is not recited in the CRL in step S501, the processing proceeds to step S503, the CPU 101 determines that the certificate is valid, and the processing ends. Also, when the validity of a plurality of certificates are confirmed here, processing for determining whether or not the validity of all of the plurality of certificates is confirmed following step S502 and step S503, and returning to step S501 when confirmation of all certificates has not ended may be added.

Figure 6:
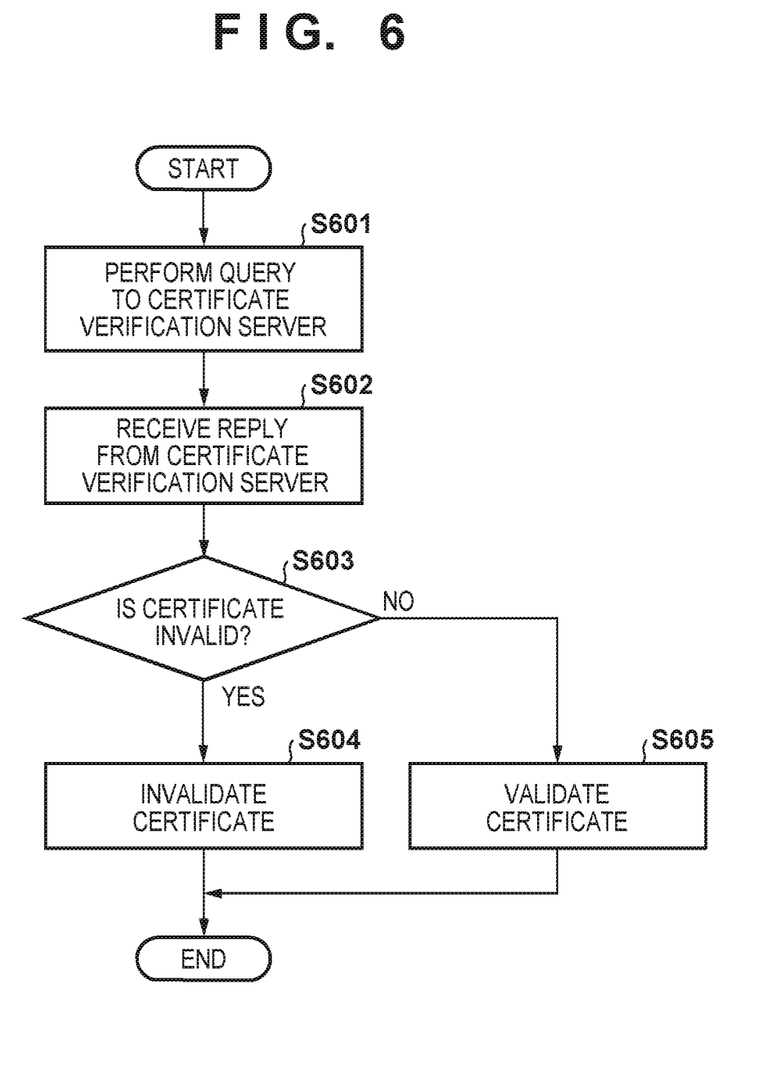
FIG. 6 is a flowchart for describing processing in which the image forming apparatus according to the first embodiment determines whether or not a certificate is valid when an OCSP mode is selected as the certificate verification mode.

FIG. 6 is a flowchart for describing processing in which the image forming apparatus 100 according to the first embodiment determines whether or not a certificate is valid when the OCSP mode is selected as the certificate verification mode. Also, the processing described by the flowchart is achieved by executing a program that the CPU 101 deployed to the RAM 103 from the flash memory 102.

The mode is set by the OCSP button 202 being selected in FIG. 2A.

Firstly, in step S601, the CPU 101 makes a query to the certificate verification server 123 relating to a certificate for which the validity is desired to be confirmed via the network I/F 109 and the LAN 120. Next, the processing proceeds to step S602, and the CPU 101 receives a reply from the certificate verification server 123. Next, the processing proceeds to step S603, and the CPU 101 determines whether or not the certificate is valid based on the reply. Here, the processing proceeds to step S604 in a case it is determined that the reply is that the certificate is invalid in step S603, and the CPU 101 determines that the certificate is invalid and ends the processing. Meanwhile, the processing proceeds to step S605 when it determines, in step S603, that the certificate is not invalid, and then the CPU 101 determines that the certificate is valid and ends the processing.

Figure 7:
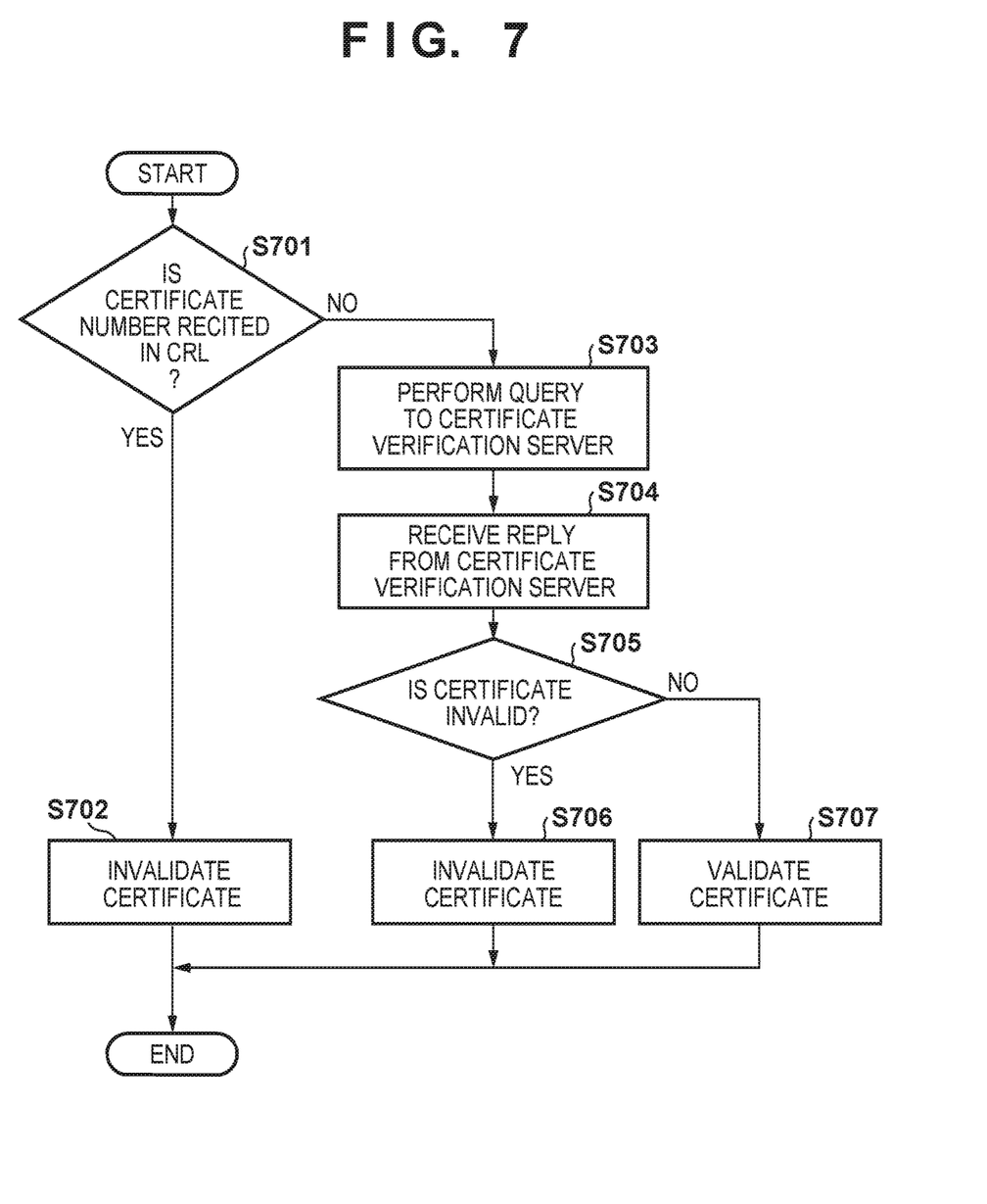
FIG. 7 is a flowchart for describing processing in which the image forming apparatus according to the first embodiment determines whether or not a certificate is valid when a CRL priority mode is selected as the certificate verification mode.

FIG. 7 is a flowchart for describing processing in which the image forming apparatus 100 according to the first embodiment determines whether or not a certificate is valid when the CRL priority mode is selected as the certificate verification mode. Also, the processing described by the flowchart is achieved by executing a program that the CPU 101 deployed to the RAM 103 from the flash memory 102.

Firstly, in step S701, similarly to step S501 of FIG. 5, the CPU 101 confirms a CRL stored in the HDD 104 and determines whether or not the certificate number which is the target of the validity verification is recited in the CRL. Here, the processing proceeds to step S702 in a case where the certificate number is not recited in the CRL, and the CPU 101 determines that the certificate is invalid and ends the processing.

However, in step S701, the processing proceeds to step S703 in a case where it determines that the certificate number is not recited in the CRL. In step S703, the CPU 101 makes a query relating to the certificate to the certificate verification server 123 via the network 124. Next, the processing proceeds to step S704 and the CPU 101 receives a reply from the certificate verification server 123. Next, the processing proceeds to step S705, and the CPU 101 determines whether or not there is a reply that the certificate is invalid, and if it is determined that the certificate is invalid, the processing proceeds to step S706, the CPU 101 determines that the certificate is invalid, and the processing ends. Meanwhile, upon determining that the certificate is not invalid in step S705, the processing proceeds to step S707, and then the CPU 101 determines that the certificate is valid and ends the processing.

In FIG. 7, because the mode is for prioritizing CRL, first whether or not there is a certificate number, for which validity is desired to be verified, in the CRL is examined, and if the number of the certificate is recited in the CRL, it is determined that the certificate is invalid. Meanwhile, if the certificate number is not recited in the CRL, a query is made to the certificate verification server 123, and it is determined whether the certificate is valid or invalid.

By the first embodiment as described above, a CRL priority mode is arranged, and the verification of the certificate by the certificate verification server is performed only when a certificate is not recited in the CRL. By this, it is possible to verify whether the certificate is valid or invalid while reducing access to the network.

Second Embodiment

Next, description will be given for certificate verification processing in the CRL priority mode in the image forming apparatus according to a second embodiment of the present invention. Also, because configuration of the image forming apparatus 100 and the system according to the second embodiment are the same as in FIG. 1 of previously described the first embodiment, their description will be omitted.

Figure 8:
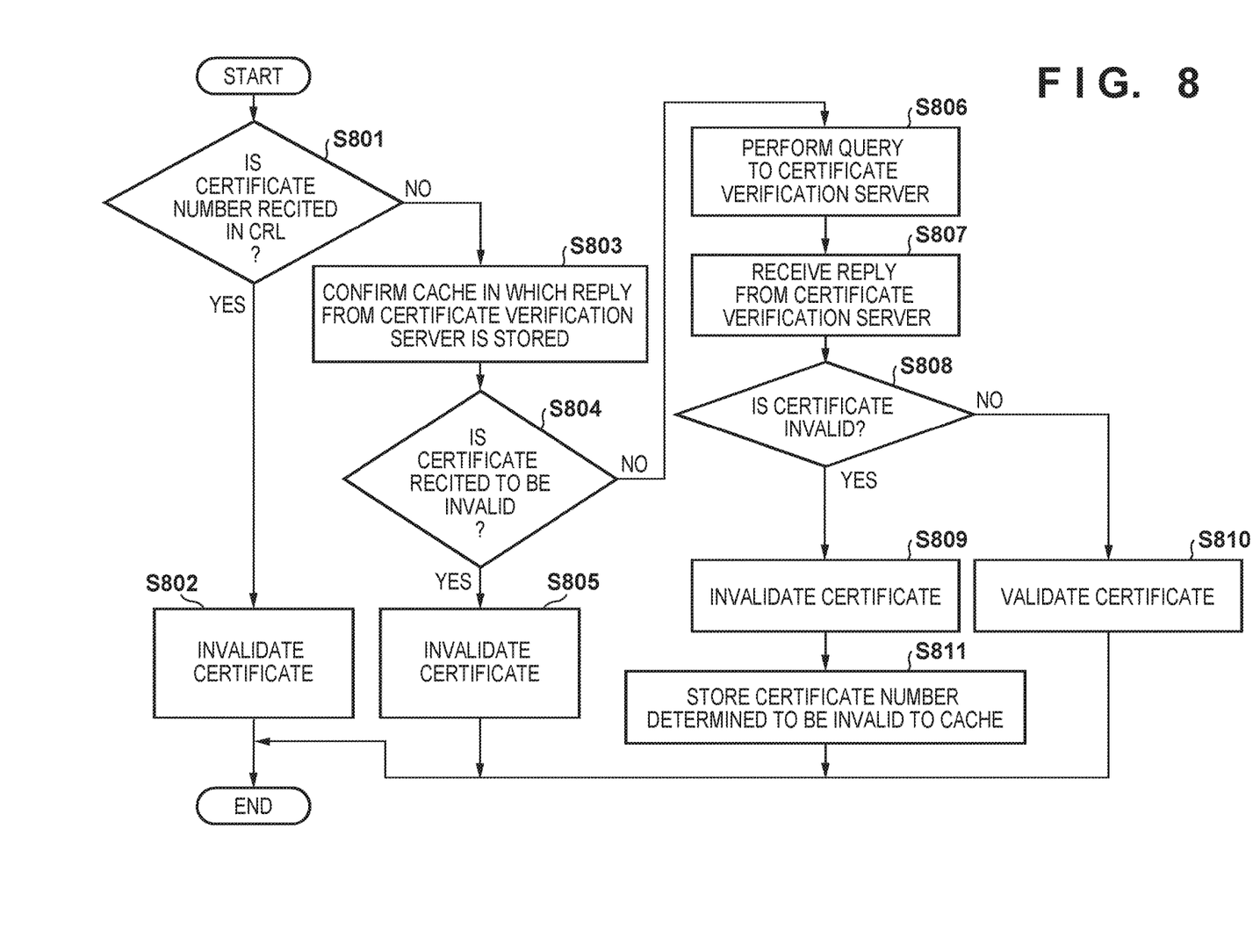
FIG. 8 is a flowchart for describing processing in which the image forming apparatus according to a second embodiment determines whether or not a certificate is valid when a CRL priority mode is selected as the certificate verification mode.

FIG. 8 is a flowchart for describing processing in which the image forming apparatus 100 according to the second embodiment determines whether or not a certificate is valid when the CRL priority mode is selected as the certificate verification mode. Also, the processing described by the flowchart is achieved by the CPU 101 executing a program that it deployed to the RAM 103 from the flash memory 102. Because step S801 and step S802 of FIG. 8 are the same as step S701 and step S702 of FIG. 7 of the first embodiment, their description will be omitted.

In step S803, the CPU 101 confirms a cache in which a reply from the certificate verification server 123 stored in the HDD 104 is stored. The cache stores a file which holds a certificate number for which invalid was replied when a query to the certificate verification server 123 was made previously. Next, the processing proceeds to step S804, and the CPU 101 determines whether or not the certificate number which is the target of the validity verification is stored in the cache. If it is determined that the certificate number is stored in the cache in step S804, the processing proceeds to step S805 the CPU 101 determines that the certificate is invalid, and the processing ends.

Meanwhile, in step S804, if it is determined that the certificate number is not stored in the cache, the processing proceeds to step S806, and similar to step S703 through step S707 of FIG. 7 described previously, it is determined whether or not the certificate is valid in step S806 through step S810. In step S811, the CPU 101 adds the certificate number determined to be invalid to the file of the cache described previously and ends the processing.

By the second embodiment, as described above, the certificate number invalidated in the reply received from the certificate verification server is stored as a cache, and the validity of the certificate is determined by referencing the cache prior to making a query to the certificate verification server. By this, an invalid certificate can be quickly determined. Also, it is possible to perform a verification of a certificate while reducing access to the network because replies from the certificate verification server can be referenced in addition to the CRL.

Also, configuration may also be taken such that information held in the cache is updated by the image forming apparatus 100 regularly making a query as to the validity of a certificate to the certificate verification server 123 and holding a result thereof in the aforementioned cache.

Third Embodiment

Next, description will be given for certificate verification processing in the CRL priority mode in the image forming apparatus according to a third embodiment of the present invention. Also, because configuration of the image forming apparatus 100 and the system according to the third embodiment are the same as in FIG. 1 of previously described the first embodiment, their description will be omitted.

Figure 9:
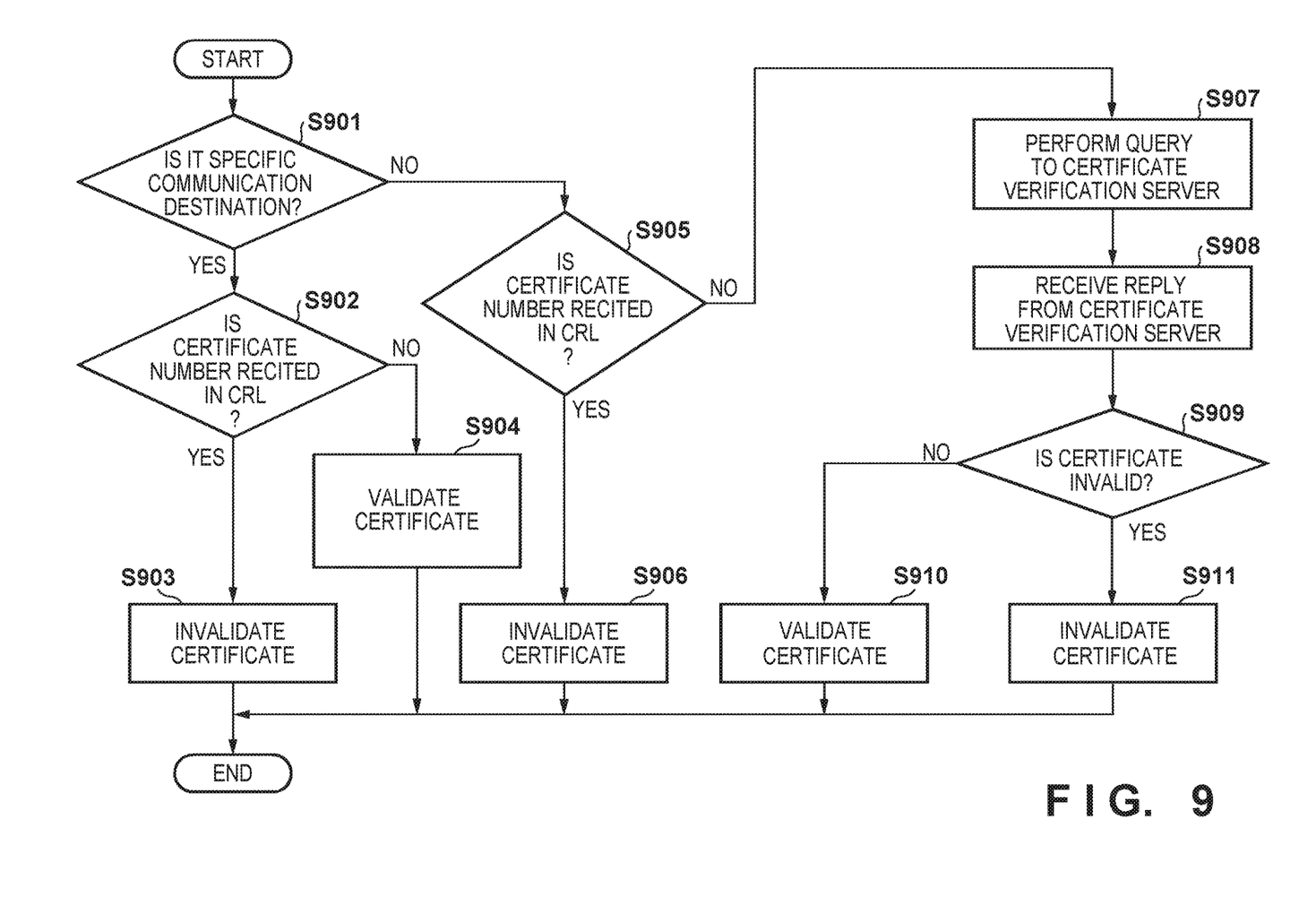
FIG. 9 is a flowchart for describing processing in which the image forming apparatus according to a third embodiment determines whether or not a certificate is valid when a CRL priority mode is selected as the certificate verification mode.

FIG. 9 is a flowchart for describing processing in which the image forming apparatus 100 according to the third embodiment determines whether or not a certificate is valid when the CRL priority mode is selected as the certificate verification mode. Also, the processing described by the flowchart is achieved by executing a program that the CPU 101 deployed to the RAM 103 from the flash memory 102. Because step S905 to step S911 of FIG. 9 are the same as step S701 to step S707 of FIG. 7 of the first embodiment, their description will be omitted.

The difference between the third embodiment and the previously described first and second embodiments is that a certificate of a specific communication destination or issuing source is registered in advance and only the CRL is referenced in a verification of a certificate that matches a condition of such a registration. Here, a specific communication destination refers to an on-premises server and the like for which a user themself operates, for example. Also, a specific issuance source of a certificate refers to a private certificate authority of the user themself. In this way, in a case of a private certificate authority or an on-premises server that the user themself operates, a query to the certificate verification server is not performed because the user themself can ascertain the validity of the certificate.

In step S901, the CPU 101 discriminates whether it is a certificate of a specific issuing source or a specific communication destination that matches a condition of a pre-registration. Here, if it is discriminated to be a certificate of a specific issuing source or a specific communication destination in step S901, the processing proceeds to step S902, and verification of the certificate described in step S501 through step S503 of the flowchart of FIG. 5 described previously is performed in step S902 through step S904. On the other hand, if it is not discriminated to be a certificate of the specific issuing source or the specific communication destination in step S901, the processing proceeds to step S905, and the CPU 101 executes the certificate verification processing illustrated in step S701 to step S707 of FIG. 7 described previously.

By virtue of the third embodiment as described above, it is possible to perform a certificate verification while reducing the frequency of access to a certificate verification server by determining validity/invalidity of a certificate by only the CRL in the case of a specific communication destination or a certificate of a specific issuing source of certificates.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-034716, filed Feb. 25, 2016 which is hereby incorporated by reference herein in its entirety.

What is claimed is:

1. An image forming apparatus for performing an encrypted communication using a public key, the apparatus comprising:
a memory device that stores a set of instructions; and
at least one processor that executes the instructions to:
obtain a certificate revocation list to store in a memory;
cause a user to select a mode for verifying a validity of a certificate of the public key, wherein the mode includes any one of using of the certificate revocation list, performance of a query to a certificate verification server, and both of using of the certificate revocation list and the performance of the query to the certificate verification server;
in a case that the mode including the performance of the query to the certificate verification server is selected by the user, make a query to the certificate verification server as to determine the validity of the certificate of the public key;
in a case that the mode including the using of the certificate revocation list is selected by the user, determine the validity of the certificate using the certificate revocation list stored in the memory; and
in a case that the mode including both of using of the certificate revocation list and the performance of the query to the certificate verification server is selected by the user, and if it is determined that the certificate is not revoked using the certificate revocation list stored in the memory, make the query to the certificate verification server to determine the validity of the certificate of the public key.

2. The image forming apparatus according to claim 1, wherein upon storing the certificate revocation list in the memory, the certificate revocation list is obtained from a certificate authority.

3. The image forming apparatus according to claim 1, wherein in the case that the both the certificate revocation list and the performance of the query to the certificate verification server are selected, a determination according to the certificate revocation list is prioritized.

4. The image forming apparatus according to claim 3, wherein in the case that the mode of using both the certificate revocation list and the performance of the query to the certificate verification server is selected, the validity of the certificate is determined in accordance with the performance of the query if it is not determined that the certificate is invalid by the certificate revocation list.

5. The image forming apparatus according to claim 3,
wherein the processor executes the instructions further to cache a result of the query,
wherein in the case that the mod of using both the certificate revocation list and the performance of the query is selected, the validity of the certificate is determined in accordance with the performance of the query in a case when the certificate is not stored as invalid in the cache.

6. The image forming apparatus according to claim 5, wherein the processor executes the instructions further to, when it is determined that the certificate is invalid in accordance with the performance of the query, cause a determination result to be held in the cache.

7. The image forming apparatus according to claim 5, wherein the processor executes the instructions further to, in the case that mode for both the certificate revocation list and the performance of the query to the certificate verification server is selected,
 (i) first determine the validity of the certificate using the certificate revocation list stored in the memory,
 (ii) in a case that it is determined that the certificate is not revoked using the certificate revocation list stored in the memory, determine the validity of the certificate in accordance with the result of the cache, and
 (iii) in a case that it is determined that the certificate is not revoked in accordance with the result of the cache, make the query to the certificate verification server to determine the validity of the certificate of the public key.

8. The image forming apparatus according to claim 1, wherein the processor executes the instructions further to discriminate whether or not an issuing source of the certificate is a particular communication destination or certificate issuing source, and
 wherein the validity of the certificate is determined based on the certificate revocation list stored in the memory when it is discriminated that the issuing source of the certificate is the particular communication destination or certificate issuing source.

9. The image forming apparatus according to claim 1, wherein the processor executes the instructions further to instruct an obtainment of the certificate revocation list.

10. An authentication system, comprising:
 an image forming apparatus for performing an encrypted communication using a public key;
 a certificate authority; and
 a verification server configured to verify a validity of a certificate,
 wherein the image forming apparatus comprises:
  a memory device that stores a set of instructions;
  at least one processor that executes the instructions to:
  obtain a certificate revocation list from the certificate authority and store the certificate revocation list in a memory;
  cause a user to select a mode for verifying a validity of a certificate of the public key, wherein the mode includes any one of using of the certificate revocation list, performance of a query to a certificate verification server, and both of using of the certificate revocation list and the performance of the query to the certificate verification server;
  in a case that the mode including the performance of the query to the certificate verification server is selected by the user, make a query to the verification server to determine the validity of the certificate of the public key;
  in a case that the mode including the using of the certificate revocation list is selected by the user, determine the validity of the certificate using the certificate revocation list stored in the memory; and
  in a case that the mode including both of using of the certificate revocation list and the performance of the query to the certificate verification server is selected by the user, and if it is determined that the certificate is not revoked using the certificate revocation list stored in the memory, make the query to the certificate verification server to determine the validity of the certificate of the public key.

11. A method of controlling an image forming apparatus for performing an encrypted communication using a public key, the method executed by a processor of the image forming apparatus comprising:
 obtaining a certificate revocation list to store in a memory;
 causing a user to select a mode for verifying a validity of a certificate of the public key, wherein the mode includes any one of using of the certificate revocation list, performance of a query to a certificate verification server, and both of using of the certificate revocation list and the performance of the query to the certificate verification server;
 in a case that the mode including the performance of the query to the certificate verification server is selected by the user, making a query to the certificate verification server to determine the validity of the certificate of the public key;
 in a case that the mode including the using of the certificate revocation list is selected by the user, determining the validity of the certificate using the certificate revocation list stored in the memory; and
 in a case that the mode including both of using of the certificate revocation list and the performance of the query to the certificate verification server is selected by the user and if it is determined that the certificate is not revoked using the certificate revocation list stored in the memory, making the query to the certificate verification server to determine the validity of the certificate of the public key.

12. A non-transitory computer readable storage medium storing a program for causing a processor to execute a method of controlling an image forming apparatus for performing an encrypted communication using a public key, the program comprising code to execute:
 obtaining a certificate revocation list to store in a memory;
 causing a user to select a mode for verifying a validity of a certificate of the public key, wherein the mode includes any one of using of the certificate revocation list, performance of a query to a certificate verification server, and both of using of the certificate revocation list and the performance of the query to the certificate verification server;
 in a case that the mode including the performance of the query to the certificate verification server is selected by the user, making a query to the certificate verification server to determine the validity of the certificate of the public key;
 in a case that the mode including the using of the certificate revocation list is selected by the user, determining the validity of the certificate using the certificate revocation list stored in the memory; and
 in a case that the mode including both of using of the certificate revocation list and the performance of the query to the certificate verification server is selected by the user and if it is determined that the certificate is not revoked using the certificate revocation list stored in the memory, making the query to the certificate verification server to determine the validity of the certificate of the public key.

* * * * *